Nov. 5, 1935.   P. P. ROCKCASTLE ET AL   2,020,041
HYDRAULIC STEERING DEVICE
Filed March 20, 1933   2 Sheets-Sheet 2
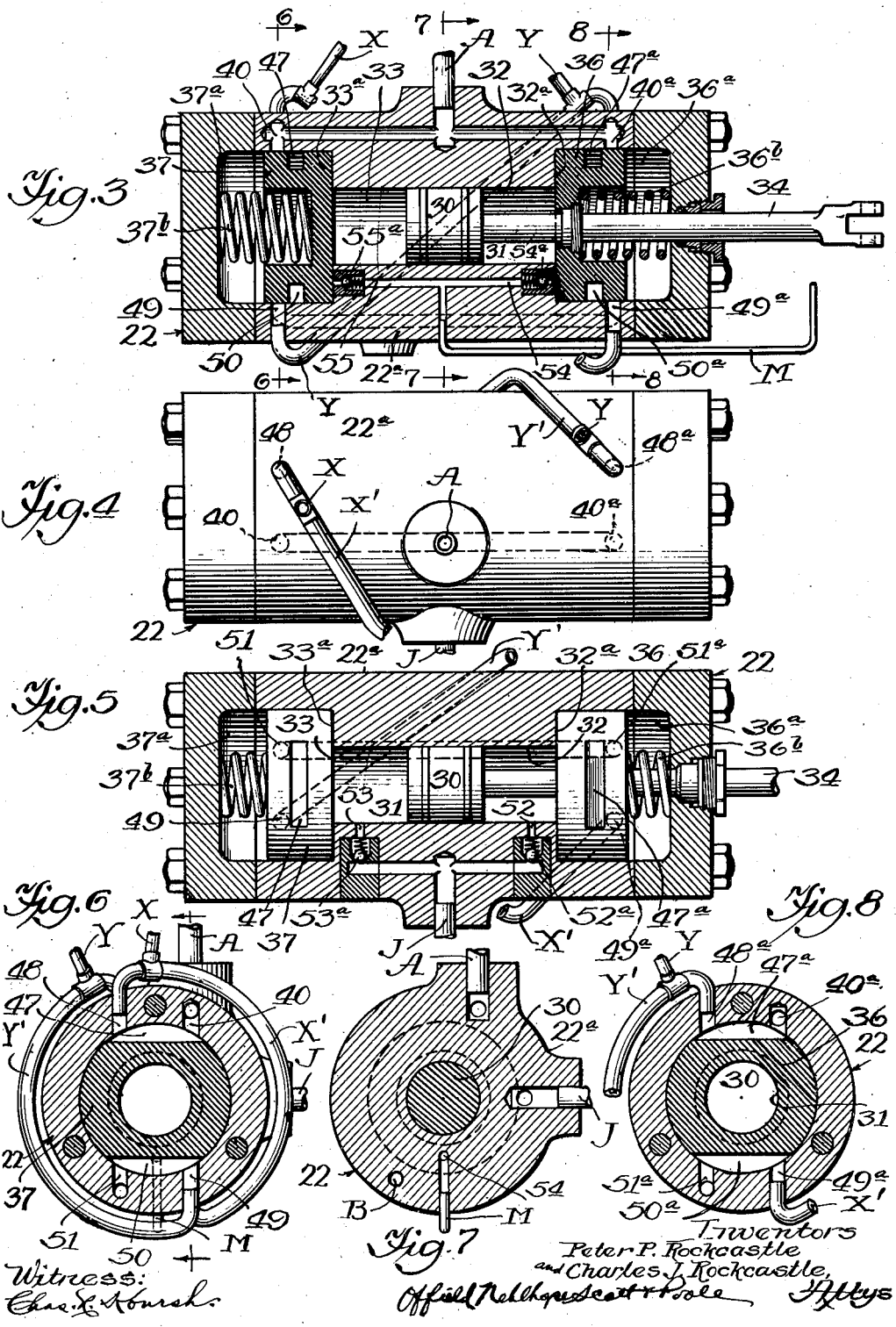

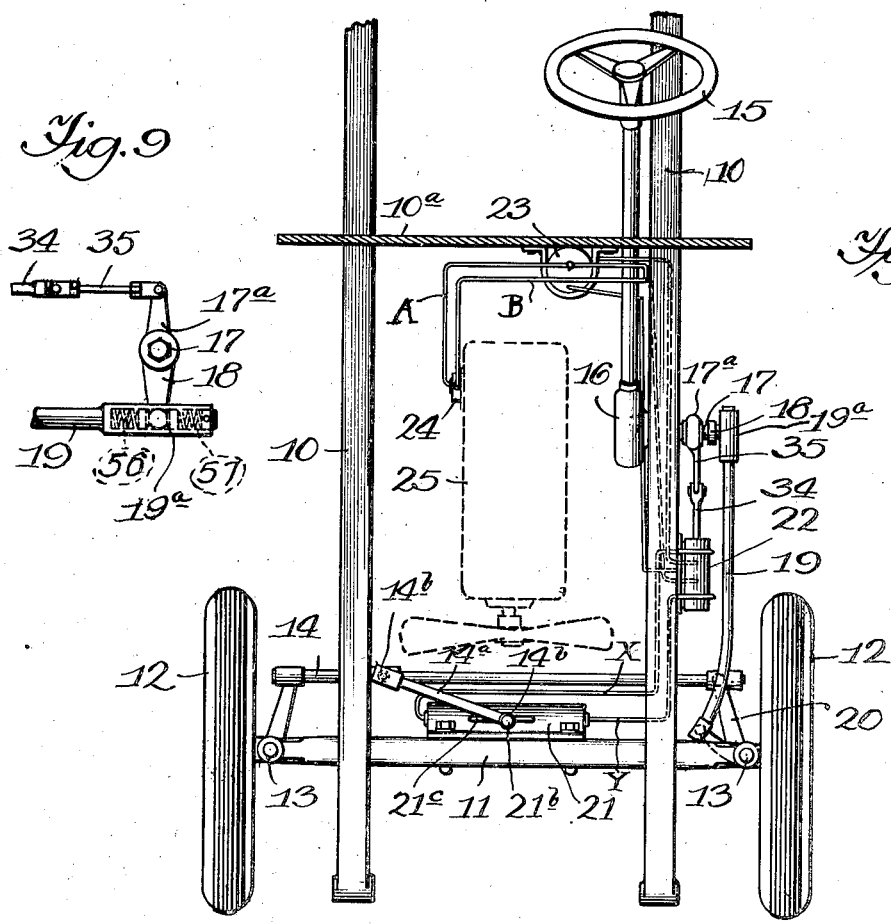

Patented Nov. 5, 1935

2,020,041

UNITED STATES PATENT OFFICE 2,020,041

HYDRAULIC STEERING DEVICE

Peter P. Rockcastle and Charles J. Rockcastle, Chicago, Ill.

Application March 20, 1933, Serial No. 661,772

8 Claims. (Cl. 60—52)

This invention relates to improvements in hydraulic control devices, and more particularly to such control devices as applied to the steering mechanism of automobiles.

Among the objects of our invention is the provision of a steering gear that is operated by positive power supplied by the engine or other source, so as to relieve the driver of most of the muscular effort now required for steering the vehicle with the usual mechanical steering devices. With the recent trend of development toward larger pneumatic tires and higher touring speeds, it has become increasingly difficult to provide sufficient gear reductions to resist the reactionary forces that are returned through the steering gear to the hands of the operator, without excessively increasing the movement of the steering wheel for producing a given turning radius. One of the most serious hazards in automobile travel is the possibility of a tire blowout when travelling at high speed. As is well known, such an occurrence has often been the initial cause of many serious accidents, due to the fact that even the most cautious driver may temporarily lose control of the car when the shock from the blowout tends to swerve the steering gear.

With our hydraulic steering gear control, the road shocks are not transmitted to the steering wheel, but are resisted by the practically incompressible liquid in the system, so as to eliminate all tendency to "shimmy" or swerve under all conditions of operation.

As a further feature of the invention, we have provided a novel form of two-way control valve, which is positive and instantaneous in action, and includes means for automatically closing upon cessation of movement of the manual control device, regardless of its position when cessation occurs, and to relieve the control devices of all stresses required for holding the steering gear in any given position of the wheels.

It will appear further from the following description that the control valve is not limited in its application to a steering gear, but is capable of a wide variety of uses in hydraulic control systems.

In carrying out our invention, we have illustrated herein our improved hydraulic system as utilized in combination with the standard steering gear mechanism of an automobile, and coordinated therewith so that the standard steering gear operates as a supplemental safety device, affording mechanical steering control only in case of failure of operation of the hydraulic system. It will be understood, however, that in its broader aspect our invention is capable of providing the sole operating medium between the steering wheel and the front wheels of the vehicle.

The invention may best be understood by reference to the accompanying drawings, in which:

Fig. 1 is a plan diagrammatic view showing the front end of an automobile chassis to which our hydraulic steering device has been applied.

Fig. 2 is a diagram showing the connections between the pressure pump, accumulator, control valve and steering cylinder.

Fig. 3 is an enlarged detail section of the control valve, taken on line 3—3 of Fig. 6 slightly offset from the cylinder axis.

Fig. 4 is a top plan view of the valve shown in Fig. 3.

Fig. 5 is a view of the control valve shown in the same position as in Fig. 4, but with the casing shown in section.

Figs. 6, 7 and 8 are transverse sections taken on lines 6—6, 7—7 and 8—8, respectively, of Fig. 3, but showing the ports in Figs. 6 and 8 in opened position.

Fig. 9 is an enlarged detail view of a portion of the steering gear shown in Fig. 1.

Referring now to details of the embodiment of our invention illustrated in the drawings, the portion of an automobile chassis shown in Fig. 1 includes a frame 10, front axle 11 and front wheels 12, 12 pivoted on knuckles 13, 13 at the end of said axle. Said wheels are connected by a tie rod 14 in the usual manner. A steering gear of standard construction is indicated as comprising a steering wheel 15, worm gear housing 16, cross shaft 17, steering lever 18, steering arm 19 and knuckle arm 20.

The main elements of the hydraulic system shown are a steering cylinder 21 mounted on the front axle 11, a control valve 22 mounted on one of the side frame members adjacent the base of the steering wheel 15, an accumulator 23 suitably mounted as on the dashboard 10ª, and a hydraulic pump 24 of any usual form. Said pump may be driven by the motor 25 in any suitable manner, not shown, or pressure may be supplied in any equivalent manner, as by a motor intake or exhaust pump of the types well known in the art.

The steering cylinder 21 has a double acting piston 21ª reciprocably mounted therein, having a centrally disposed cross-pin 21ᵇ extending through longitudinal slot 21ᶜ, and suitably connected to the tie rod 14 as by a link 14ª having ball and socket connections 14ᵇ, 14ᵇ.

Referring now to details of the control valve 22 and its several connections with the other parts of the system, said valve comprises a generally cylindrical casing 22ᵃ. A reciprocal piston 30 is mounted in a central bore 31, leaving chambers 32, 33 at opposite ends of said piston. The latter is operated by a suitable manual controlling device, herein consisting of a piston rod 34, connected by link 35 to a lever 17ᵃ on steering shaft 17, which as before described constitutes part of the usual steering gear mechanism.

A pair of valve members 36, 37 are slidably mounted in enlarged chambers 36ᵃ, 37ᵃ at the outer ends of the chambers 32, 33, respectively. As shown in Figs. 3 and 5, said valve members are adapted to seat against shoulders 32ᵃ, 33ᵃ surrounding the ends of chambers 32, 33 and are normally held in closed position thereagainst by coil springs 36ᵇ, 37ᵇ, respectively.

The control means and hydraulic connections at opposite ends of the control valve extend to the two ends of the steering cylinder 21 for reciprocably operating the latter. For convenience, the construction and arrangement of the control means at one end of said control valve will first be described as it produces movement of the steering piston 21ᵃ from left to right, as seen in Fig. 2. This movement is caused by shifting the control piston 30 downwardly as seen in Fig. 2, or toward the left as seen in Figs. 3, 4 and 5.

The lower part of accumulator 23 indicated in Fig. 2, constitutes a pressure chamber 41 connected to the high pressure line A by pipe 41ᵃ. Said accumulator has a piston 42 therein with a compression spring 43 in the upper chamber 44 arranged to counteract the pressure exerted by the pump, and store up energy from the latter. The upper chamber 44 is connected by line 44ᵃ to the low pressure or intake line B. A safety valve 45 is also connected from high pressure line A to low pressure line B to relieve excessive pressure supplied by pump 24.

The high pressure line A leads to inlet ports 40, 40ᵃ opening into end chambers 36ᵃ and 37ᵃ, but which are normally closed by the valve members 36 and 37, respectively, when the latter are in seated position against shoulders 32ᵃ and 33ᵃ as shown in Figs. 3 and 5.

By shifting piston 30 toward chamber 33, it will be seen that valve member 37 is opened by liquid pressure, and a slot 47 carried on one side of said valve member is moved into registering position with the inlet port 40. Said slot is simultaneously brought into registering position with an adjacent port 48 (see Fig. 6). The pressure from line A is, therefore, effective through the latter port to line X communicating with the left end of steering cylinder 21 so as to move the steering piston 21ᵃ toward the right.

At the same time, means are provided for drawing a corresponding amount of liquid from the right end of cylinder 21 and through line Y. The latter line leads to a port 49 in chamber 37ᵃ opposite port 48 (see Fig. 6). A slot 50 in the side of valve member 37 (opposite and in transverse alignment with slot 47) is arranged to communicate with port 51 when said valve member is open. The latter port communicates through low pressure line B to the intake side of pump 24, so that the liquid from the right side of steering piston is drawn out during the same period that pressure is applied to the left side of said piston. Means are provided for feeding additional liquid to chamber 32 while said piston 30 is being moved so as to increase the volume of said chamber. This is desirable because the outer ends of chamber 32 are closed by valve member 36 during this stage of the operation. This feeding is accomplished through duct 52 in casing 22 (see Fig. 5) connecting chamber 32 with a common line J and preferably having check valve 52ᵃ therein so as to permit ingress only of liquid from said line J into chamber 32. A companion duct 53 and check valve 53ᵃ are arranged to feed chamber 33 in a similar manner, when the control piston is moved in the opposite direction. The line J leads to a suitable liquid storage tank, as herein shown, the upper chamber 44 of the accumulator 23 being used for this purpose, and the line J being connected thereto adjacent the upper limit of normal movement of the piston 42 and below the normal liquid level, as shown in Fig. 2.

Means are also provided for cutting off pressure upon the steering piston upon cessation of movement of piston 30 toward valve 37. This is accomplished by relieving pressure within chamber 33 so as to permit the valve 37 to become seated again under pressure of spring 37ᵇ in chamber 37ᵃ, thereby cutting off ports 40 and 48 from intercommunication. For this purpose a pair of ducts 54, 55 (see Fig. 3) in casing 22ᵃ connecting the valve seats 32ᵃ and 33ᵃ with a common line M, and preferably having check valves 54ᵃ, 55ᵃ therein, respectively, are arranged to permit egress only of liquid from said valve seats into said line M. The ports controlled by valves 55ᵃ and 54ᵃ are sufficiently small to throttle the flow therethrough, so that sufficient pressure is created by movement of piston 30 to move the valve members 36 and 37 into open position. The latter line, as in the case of line J, may also lead to a suitable storage tank or reservoir, but in the form shown herein, is arranged to discharge into the upper chamber 44 of accumulator 23. Under ordinary conditions, the amount of liquid discharged through line M in relieving the valves 36 and 37 will balance the amount supplied to the chambers 32 and 33 through line J, so as to maintain a substantially uniform liquid level in chamber 44. Means for further maintaining the liquid balance of the system will hereinafter be more fully described.

As hereinabove suggested, the valve structure at the opposite end of the valve casing controlled by valve member 36, includes inlet and outlet ports 40ᵃ, 48ᵃ, 49ᵃ and 51ᵃ duplicating and corresponding to ports 40, 48, 49 and 51, excepting that being at the opposite end of the valve casing, the relative positions of each pair of outlet ports 48, 49ᵃ and 48ᵃ, 49 are reversed with respect to each other, and are cross-connected to opposite sides of the valve casing by manifolds x' and y', respectively. Similarly, slots 47ᵃ and 50ᵃ are formed in opposite sides of valve member 36 to correspond with similar slots 47 and 50 formed in the valve member 37.

The ports at opposite ends of the valve, thus being in corresponding positions with respect to each other, are arranged for effecting movement of the steering piston 21ᵃ from right to left instead of from left to right, by reversing the movement of the operating piston 30 so as to open the valve member 36 and establish communication between ports 40ᵃ and 48ᵃ simultaneously with establishing communication between ports 49ᵃ and 51ᵃ, as indicated in Fig. 8. The corresponding ports 40, 48, 49 and 51 at the opposite end of the valve will, of course, be closed by the valve member 37, which itself is maintained in closed position against the end of chamber 33, while the piston 30 is being moved away from the latter valve member in opening the valve member 36. Consequently the pressure from line A will be directed through port 40ª, slot 47ª, port 48ª and line Y to the right side of the steering piston 21, while the line B will be opened between the intake side of the pump 24 and the left end of steering cylinder 21 through port 49ª, slot 50ª and port 51ª. The piston 21ª in the steering cylinder will, therefore, be moved from right to left, until cessation of movement of the control piston 30 toward valve member 36, whereupon the spring 36ᵇ in chamber 36ª will restore the valve member 36 to closed position, forcing excessive liquid in chamber 32 through duct 54 into drain line M, and thence to the reservoir chamber 44 of accumulator 23.

One of the principal functions of the accumulator 23 is to store up sufficient energy to operate the steering gear several times after the pump 24 becomes inoperative, as for instance when the automobile engine becomes stalled or is stopped as when parking.

A further function of the accumulator 23 is to compensate for temporary fluctuations of pressure in the system and to cushion the effects due to opening or closing of the valves. In carrying out this object, it will be observed that a filler cap 54ª is normally arranged to seal the upper chamber 44 of the accumulator so that there is an air chamber above the liquid level in the latter chamber. While the pump 24 is operating, the liquid in said upper chamber is connected to the intake side of said pump through line 44ª, and a part of the liquid in said upper chamber will therefore be drawn out to correspond with the rise of the piston 42 under varying pressures effective on the bottom thereof through line 41ª from high pressure line A. Under operating conditions a state of equilibrium will be established in said chamber, in which a predetermined amount of liquid will remain in said upper chamber, and the head of air above the liquid level will be maintained substantially at atmospheric pressure. Said head of air, supplemented by spring 43, serves as a cushion to offset excessive fluctuations or variations from normal pressure effective in either direction, particularly such as may be caused by opening or closing of the control valves.

The principal advantage of utilizing the upper chamber 44 of the accumulator as a liquid reservoir to which the auxiliary supply line J and the auxiliary relief line M are connected, may now be described. As was pointed out in connection with the description of the latter lines, the amount of liquid normally drained into the upper chamber through line M will be substantially the same as the amount drawn out through line J during operation of the valve mechanism. It will be understood, however, that a small amount of leakage may be anticipated from the high to low pressure sides of the system, which leakage, for instance, may occur around valve members 36 and 37 and through relief ducts 54 and 55 and line M to chamber 44. With the arrangement shown, the excess liquid which thus finds its way into said chamber will increase the pressure in said chamber, thereby tending to unbalance the equilibrium established therein during normal operation of the system. Since the liquid in the latter chamber is under suction of the pump 24 through line 44ª, the liquid in excess of the normal amount in said chamber will automatically be drawn off through line 44ª until equilibrium is restored, and such excess liquid will thus be restored to the main lines of the system through said pump. In this manner the operating lines will be maintained full of liquid at all times.

The use and advantages of the hydraulic control mechanism above described will now be manifest to those skilled in the art. The control valve 22 is practically instantaneous in operation, so that when connected for operation by a part of the standard steering gear as illustrated in Figs. 1 and 9, the hydraulic system can readily be arranged to cause movement of the steering wheels slightly in advance of the movement of the intervening mechanical connections, herein consisting of the steering lever 18, steering arm 19, and knuckle arm 20. This is due to the fact that the last named parts usually have sufficient lost motion or play, as for instance, as illustrated in Fig. 9, where springs 56, 57 are interposed, as usual, between the end of steering lever 18 and the opposite ends of sleeve 19ª on the rear end of steering arm 19. Consequently, the hydraulic power is applied to the wheels in either direction before the usual mechanical system becomes effective, and the volume of liquid supplied through said valve can be proportioned so that the hydraulic system leads the mechanical system in all steering movements.

Although the practical advantages of safety afforded by the combination of the hydraulic and mechanical steering connections will be obvious, yet it will be understood that our improved hydraulic mechanism can be used independently of any mechanical connections, if desired, in which case the control valve can be directly operated by the steering wheel or any equivalent manual control device.

It will be understood further that our hydraulic system, and particularly the control valve 22, are not limited to use in an automobile steering device, but in its broader aspect our invention is capable of a wide variety of uses and may be considered as applicable to any remote control system. The form of steering cylinder 21 herein disclosed is merely illustrative of several forms of reversible actuating devices that could be employed for various purposes.

We do not, therefore, wish to be understood as limiting ourselves to the specific embodiment or method of application hereinabove disclosed, but it will be understood that various changes and modifications may be made and other purposes may be served, without departing from the spirit and scope of our invention as defined in the appended claims.

We claim:

1. In a hydraulic control system, a pump having feed and return lines, a reversible hydraulic actuating device, control valve means having a control member, a pair of valve members affording mutually reversed feed and return line connections with said actuating device, means normally maintaining said valve members in closed position, hydraulic means responsive to movement of said control member for selectively opening said valve members by hydraulic pressure, means independent of relative movement of said control member for relieving the pressure produced by said last named means upon cessation of movement of said control member, and permitting the opened valve to return to closed position.

2. In a hydraulic control system, a pump having feed and return lines, a reversible hydraulic actuating device, control valve means having a control member, a valve member affording reversible feed and return line connections with said actuating device, hydraulic means responsive to movement of said control member for selectively opening said valve member by hydraulic pressure so as to establish one or the other of said reversible feed and return line connections, means for relieving the pressure produced by said last named means upon cessation of movement of said control member, and means for returning the opened valve to closed position.

3. In a hydraulic control system of the character described, the combination of a pair of valve chambers, a cylinder, a manually controllable piston reciprocably mounted therein, and having a control valve port communicating with each of said valve chambers, a valve member in each of said chambers movable hydraulically in response to movement of said piston, hydraulic feed and return lines each having, a pair of inlet and outlet connections in each of said valve chambers, liquid in said system, means in each of said valve members for establishing independent communication between each of its respective pairs of inlet and outlet connections when said valve member is in open position relative to its control valve port, means normally urging said valve members to close their respective feed and return line connections, and relief means connected with opposite ends of said cylinder to relieve pressure therein upon cessation of movement of said piston in either direction.

4. In a hydraulic control system of the character described, the combination of a pair of valve chambers, a cylinder, a manually controllable piston reciprocably mounted therein and having a control valve port communicating with each of said valve chambers, a valve member in each of said chambers movable hydraulically in response to movement of said piston, hydraulic feed and return lines each having, a pair of inlet and outlet connections in each of said valve chambers, liquid in said system, means in each of said valve members for establishing independent communication between each of its respective pairs of inlet and outlet connections when said valve member is in open position relative to its control valve port, means normally urging said valve members to close their respective feed and return line connections, one-way inlet and outlet ducts connected to said cylinder at opposite sides of said piston, said inlet ducts being adapted to supply liquid to facilitate controlling movements of said piston within said cylinder and to assure prompt closing of said valve members upon cessation of movement of said piston.

5. In a hydraulic control system, a pump, a main line system including pressure and return lines, an accumulator connected between said pressure and return lines and including a casing having a yieldable piston therein, a pressure chamber on the pressure side of said piston and a liquid reservoir on the return line side of said piston, a hydraulic control valve having auxiliary inlet and outlet ducts for facilitating operations thereof, and means connecting said inlet and outlet ducts with said liquid reservoir, whereby excess liquid leaking from the main lines in said hydraulic control valve into said auxiliary ducts will be returned to the main line of the system.

6. In a hydraulic control device of the character described, the combination of a pair of valve chambers, each having a movable valve member therein, a pair of hydraulic control chambers each normally closed by one of said valve members, manually operable control means for selectively increasing the pressure in said control chambers whereby an increase in pressure in one of said control chambers will open its respective valve member, a pair of inlet and outlet connections in each of said valve chambers normally closed by said valve members, and means in each of said valve members for establishing independent communication between its respective pairs of inlet and outlet connections when said valve member is in opened position relative to its control chamber.

7. In a hydraulic control device of the character described, the combination of a pair of valve chambers, each having a movable valve member therein, a pair of hydraulic control chambers each normally closed by one of said valve members, manually operable control means for selectively increasing the pressures of said control chambers whereby an increase in pressure in one of said control chambers will open its respective valve member, a pair of inlet and outlet connections in each of said valve chambers normally closed by said valve members, means normally urging said valve members into closed position, means in each of said valve members for establishing independent communication between its respective pairs of inlet and outlet connections when said valve member is in opened position relative to its control member, and means for relieving pressure in said control chambers to permit their respective valve members to close upon cessation of increase of pressure therein.

8. In a hydraulic control system of the character described, the combination of a pair of valve chambers, a cylinder, a manually controllable piston reciprocably mounted therein and having a control valve port communicating with each of said valve chambers, liquid in said system, a valve member in each of said chambers movable hydraulically in response to movement of said piston, hydraulic feed and return lines each having a pair of inlet and outlet connections in each of said valve chambers, means in each of said valve members for establishing independent communication between each of its respective inlet and outlet connections when said valve member is in open position relative to its control valve port, one-way outlet ducts communicating with each of said valve chambers and closed by said valve members when the latter are in closed position relative to their respective control valve ports, means normally urging said valve members to close their respective control valve ports, and one-way inlet ducts connected to said cylinder at opposite sides of said piston, said inlet ducts being arranged to supply liquid to facilitate controlling movements of said piston within said cylinder, and said outlet ducts being arranged to permit the closing of said valve members upon cessation of movement of said piston.

PETER P. ROCKCASTLE.
CHARLES J. ROCKCASTLE.